United States Patent [19]

Bolner

[11] Patent Number: 4,458,843

[45] Date of Patent: Jul. 10, 1984

[54] CENTERING SYSTEM FOR SPHERICAL BEARINGS

[75] Inventor: Thomas E. Bolner, Fayetteville, Tenn.

[73] Assignee: Thiokol Corporation, Chicago, Ill.

[21] Appl. No.: 270,151

[22] Filed: Jun. 3, 1981

[51] Int. Cl.³ .............................................. F02K 9/84
[52] U.S. Cl. .................................. 239/265.35; 384/99
[58] Field of Search ........... 239/127.1, 265.35, 265.33, 239/265.19, 265.11; 308/36.2, 36.3; 384/99

[56] References Cited

U.S. PATENT DOCUMENTS

| | | | |
|---|---|---|---|
| 3,445,437 | 5/1969 | McCullough et al. | 239/265.35 |
| 3,659,788 | 5/1972 | Oldfield et al. | 239/127.1 |
| 3,727,843 | 4/1973 | Parilla | 239/265.35 |
| 3,912,172 | 10/1975 | Bolner | 239/265.35 |

Primary Examiner—John J. Love
Attorney, Agent, or Firm—Gerald K. White; Arthur H. Swanson

[57] ABSTRACT

Multiple hydraulic chambers that are located within the inner race-outer race interface of a spherical bearing are individually pressure controlled to maintain lateral, or axial, centering of the inner race relatively to the outer race. Pressure control is provided by a mechanical/hydraulic spool valve, one associated with each chamber, which senses the depth of the clearance space between the inner and outer races and pressurizes or vents the associated chamber to maintain the inner race centered in the outer race in a forcing manner. An internal actuation system for the hydraulic bearing is also provided comprising multiple cavities that are displaced both longitudinally and angularly with respect to the centering hydraulic chambers.

23 Claims, 10 Drawing Figures

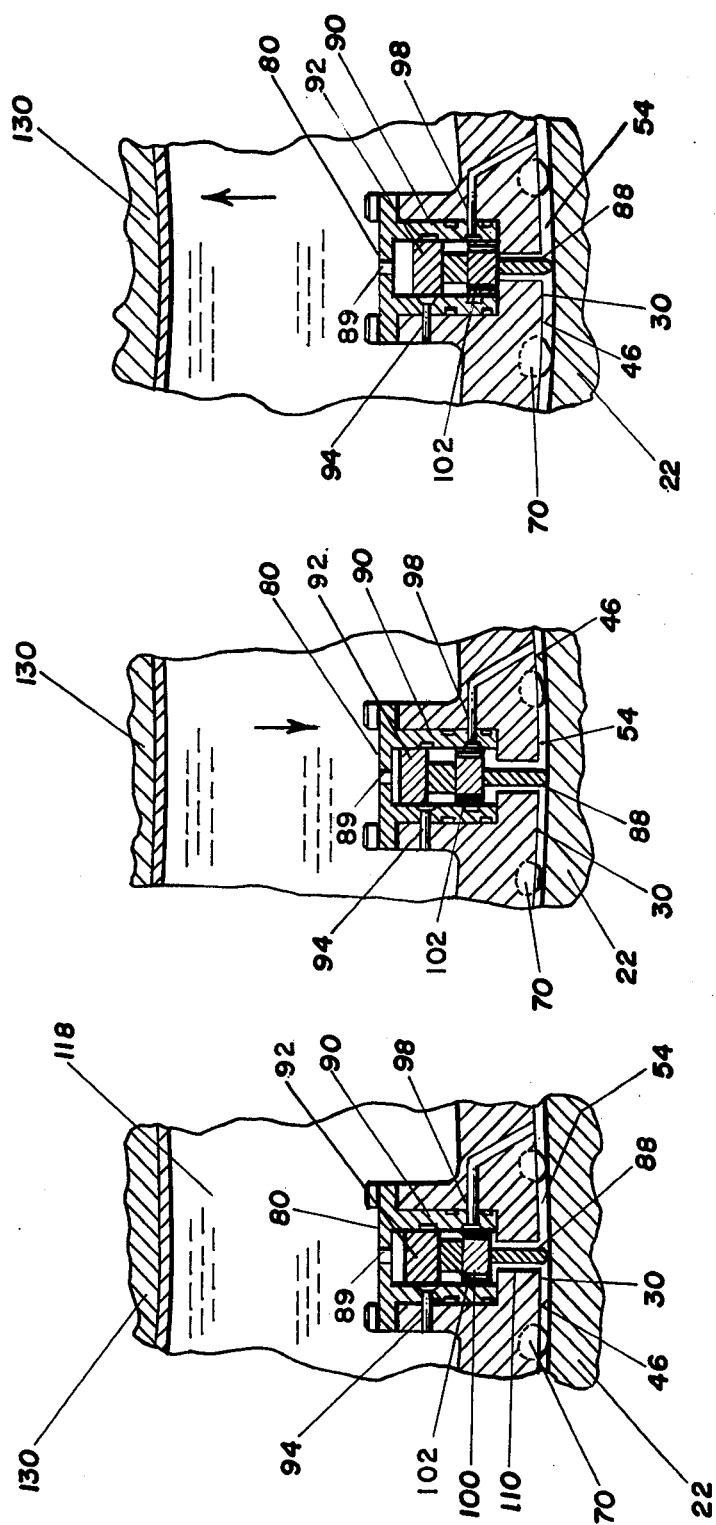

CENTERING SYSTEM FOR SPHERICAL BEARINGS

The Government has rights in this invention pursuant to Contract No. DAS G-60-75-C-0061.

BACKGROUND OF THE INVENTION

1. Field of the Invention

The present invention relates to a centering system for spherical bearings, and has particular utility in connection with spherical bearings that are employed to support the movable exhaust nozzle of rocket propelled vehicles.

2. Description of the Prior Art

Spherical bearings, particularly when exposed to heavy loads and severely hostile environments, tend to function in an improper manner and give rise to problems that degrade the performance of the equipment in which they are employed.

A particular problem or disadvantage of the movable nozzle system of thrust vector control for steering rocket propelled vehicles is the vulnerability of the joint between the static portion, that is the outer race or socket of the spherical bearing that is provided, and the movable portion, that is the inner race or ball thereof, to which the nozzle is fixedly attached. The gases produced by the propellant combustion are very hot in the region of the joint, for example, 4000° to 6000° F., are at substantially the same high pressure as that in the combustion chamber of the rocket motor, and are moving at high subsonic velocities. In order for the nozzle to be moved freely notwithstanding differential expansion of the various nozzle parts adjacent the joint, a clearance space or interstice of about 0.005 inch must be provided between the inner race and the outer race of the bearing, thus providing a crack that hot gases tend to enter. This clearance space is closed by a seal that must be capable of containing the high-temperature high-pressure gases without adding too greatly to the actuation forces that are needed to move the nozzle to steer the rocket vehicle.

Another problem of the movable nozzle system for rocket vehicle thrust control is caused by the heavy "g" loads that are experienced by rocket motors. As a result of such loads, powerful forces are brought to bear on the inner race of the bearing which tend to push it against the side of the outer race. These forces act both laterally and longitudinally with respect to the longitudinal axis of the combustion chamber and nozzle and tend to push the inner race solidly against the side of the outer race and to cause extreme friction between these parts notwithstanding the presence of a lubricant that is provided. Such friction can interfere with proper movement of the nozzle with resultant loss of steering control. There can occur, additionally, misalignment of the center line of the thrust of the nozzle with respect to that of the rocket motor and the center of gravity of the vehicle to which the nozzle is attached. Due to the high thrust output of the nozzle, this can give rise to an undesirable although slight turning moment of the vehicle.

Various proposals have been made in the prior art for overcoming such problems in the application of spherical bearings to the steering mechanisms of rocket propelled vehicles. In my prior U.S. Pat. No. 3,912,172 which is assigned to the assignee of the present invention, there is provided a system for lubricating the spherical bearing to the inner race of which the nozzle is fixedly attached in a manner such that the pressure of the lubricant in the joint is continually related to the pressure in the combustion chamber. The pressure of the lubricant applied to the joint balances or offsets the pressure load on the joint that is exerted thereon by the combustion chamber pressure as the latter acts upon the projected area of the movable nozzle. As a secondary or "back up" system for that just described, the lubricant pressure in the joint is further varied as the width of the clearance space between the inner race and outer race changes due to imbalance of the nozzle load, changes in the clearance space depth being sensed by a movable pin that contacts the inner race.

In U.S. Pat. No. 3,049,887, A. Sherman, also granted to the assignee of the present invention, there is also provided a rocket motor having a nozzle mounted by a spherical bearing. In this patent hydraulic fluid pressure is applied to the clearance space between the inner and outer races for cooling the bearing to keep it from binding and also to cool the congruent interior wall of the nozzle. The fluid is a coolant such as fuel for the motor or a coolant from a separate source.

The arrangements disclosed in the foregoing prior art patents are subject to the possibility of the occurrence of the spherical bearing problems mentioned above in that they provide no means for forcing and maintaining lateral (or axial) centering of the inner race relative to the outer race. The thrust of the disclosure of U.S. Pat. No. 3,912,172 is to balance or offset the pressure load on the bearing joint in the aft direction caused by the combustion chamber pressure acting on the projected area of the nozzle. Pressure of the lubricant applied to the joint will tend to equalize in the clearance space between the inner and outer races, and hence, to be ineffective to offset any imbalance in external lateral, or axial, forces on the inner race of the bearing. U.S. Pat. No. 3,049,877 is concerned principally with cooling the bearing and applies the cooling fluid to the joint in a manner similar to that disclosed in U.S. Pat. No. 3,912,172.

A solution to the above-mentioned problems associated with spherical bearings is provided, in accordance with the present invention, by a system that senses or detects lateral, or axial, displacement of the inner race from a central position with respect to the outer race, and rapidly effects, in a forcing manner, corrective actions as necessary to restore and maintain the inner race in a central position. As a result, the tendency for friction to occur and to interfere with the proper and desired movement of the nozzle is minimized, as is, also, the tendency for misalignment of the center line of the thrust of the nozzle with respect to the center line of the rocket motor and the center of gravity of the vehicle.

SUMMARY OF THE INVENTION

An object of the invention is to provide improvements in spherical bearings that minimize the problems of friction and adapt them for use with heavier loads in severely hostile environments.

Another object of the invention is to provide a detector and control system for the detection and correction of a lateral or axial off-center condition of the inner race of a spherical bearing.

A specific object of the invention is to provide such a spherical bearing centering detector and control system in which the off-center condition of the inner race is detected at a plurality of lateral locations around the periphery of the inner race.

Another specific object of the invention is to provide such a centering detector and control system in which an off-center condition of the inner race is mechanically detected and corrected in a forcing manner by hydraulic pressure.

A further specific object of the invention is to provide a spherical bearing centering detector and hydraulic control system in which a plurality of mechanical/hydraulic spool valve detectors are located internally of the inner race, a reservoir of hydraulic fluid for the control system also being provided internally of the inner race.

A further specific object of the invention is to provide such a spherical bearing centering detector and control system in which the detectors are located externally of the inner race.

Another object of the invention is to provide a detector and control system for the detection and correction of a lateral, or axial, off-center condition of the inner race of a spherical bearing that is employed to support the movable exhaust nozzle of a rocket propelled vehicle.

Another object of the invention is to provide a centering system for the ball of a ball joint mounted nozzle for a rocket motor wherein the nozzle is angularly movable by the application of fluid pressure from a pressure system to the ball joint to cause steering movement of the vehicle that is being driven by the rocket motor.

In accomplishing the foregoing and other objectives of the present invention, multiple hydraulic chambers, located within the inner-outer race interface of a spherical bearing, are individually pressure controlled to maintain lateral, or axial, centering of the inner race or ball relative to the outer race or socket. Pressure control is provided by a simple mechanical/hydraulic spool valve detector, one such valve detector being provided for each chamber, which senses the depth of the inner to outer race clearance space, and pressurizes or vents the chamber to keep the inner race centered in the outer race in a forcing manner.

Hydraulic fluid pressure is provided by an external power source which communicates with the spool valve of each chamber. This power source may comprise the combustion chamber pressure of a rocket motor. The "spool" in the valve communicates mechanically with the inner and outer races. When the inner race moves toward the outer race, the spool opens a passage in the valve body, which provides a fluid pressure in the chamber to force the inner race back to the center of the outer race. When the inner race moves away from the outer race, the spool closes the pressure supply passage and vents the associated chamber. At the same time, an opposing spool valve that is located 180 degrees around the bearing functions to provide fluid pressure to its associated chamber to force the inner race back to the center of the outer race.

In a first embodiment of the centering system according to the invention, the mechanical/hydraulic spool valve detectors are located internally of the inner race or ball of the spherical bearing, a reservoir of hydraulic fluid for pressurizing the hydraulic chamber also being contained within the inner race.

In a second embodiment of the centering system, the mechanical/hydraulic spool valve detectors are located externally of the inner race.

A third embodiment of the invention involves a centering system for the ball of a ball joint mounted nozzle of a rocket motor wherein the nozzle is angularly movable by the application of fluid pressure to cause steering movement thereof.

These and other objects of the invention will be readily understood from the following description of preferred embodiments of the invention, in which reference is made to the accompanying drawings.

DESCRIPTION OF THE DRAWINGS

In the drawings:

FIGS. 5, 6 and 7 are sectional diagrammatic illustrations of the operation of the lateral support valve bodies;

DESCRIPTION OF THE PREFERRED EMBODIMENTS

Figure 1:
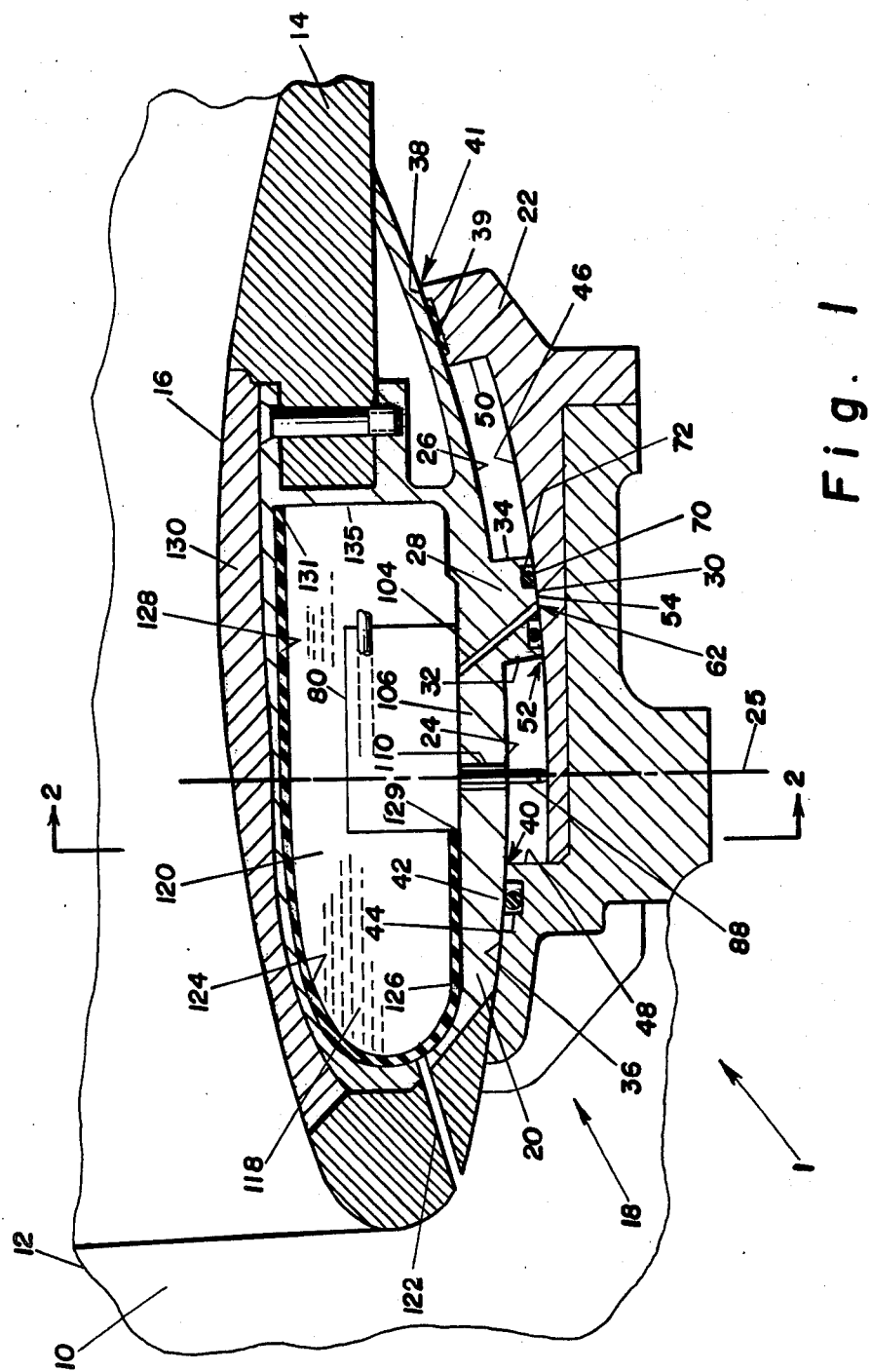
FIG. 1 is a partial longitudinal sectional view of the aft end of a rocket motor incorporating a preferred embodiment of the invention.

Preferred embodiments of the invention are shown in the drawings wherein the invention is illustrated in connection with a solid propellant rocket motor having a spherical bearing mounted movable exhaust nozzle. The invention is, however, applicable to spherical bearings used in other applications as well where it is desired to maintain the inner race centered with respect to the outer race in order to reduce friction and to improve alignment.

In FIG. 1 there is illustrated a first embodiment 1 of the invention comprising a rocket motor indicated at 10 comprising a case 12, shown broken away, containing a solid propellant, not shown, and including a thrust nozzle 14. Nozzle 14 is shown in section, partially broken away, and has formed therein an internal exit cone surface 16 of a convergent-divergent type. Nozzle 14 is mounted on case 12 by means of a spherical bearing, or ball and socket joint, indicated at 18.

Bearing 18 includes a movable inner race 20 and a static outer race 22, the outer race 22 being rigidly attached in a suitable manner to the case 12. Inner race 20 includes externally rounded surfaces 24 and 26. Surface 24 extends forward and aft of the equatorial plane, as indicated at 25 by a dot and dash line, of the pherical bearing, as seen in FIG. 1, while surface 26 is aft of the equatorial plane 25. Between the surfaces 24 and 26 the inner race 20 further includes a circumferential girth 28. Girth 28 has a rounded surface 30 and projects radially outwardly from the surfaces 24 and 26, forming oppositely disposed shoulders 32 and 34.

The outer race 22 of bearing 18 includes an annular inner rounded surface 36 that is located forward of the equatorial plane 25 and an annular inner rounded surface 38 that is located aft of the equatorial plane 25. Surfaces 36 and 38 are located internally of outer race 22 and are concentrically disposed with respect to the externally rounded surfaces 24 and 26, respectively, of inner race 20. The radius of curvature of surface 36 is slightly larger than the radius of curvature of surface 24 thereby providing a small clearance space 40 at the inner race-to-outer race or ball-to-socket interface of bearing 18 between surfaces 36 and 24. A clearance space indicated at 41 is also provided between surfaces 26 and 38. A teflon pad 39 may be included in space 41, as shown.

Clearance space 40 is fully sealed and enclosed by an annular or circumferential seal 42. Seal 42 may comprise a semi-resilient O-ring or the like and is restrained from excessive motion or extrusion into the clearance space 40 by a groove 44 that is machined into surface 36 of the outer race 22.

Outer race 22 further includes internally thereof, intermediate the surfaces 36 and 38, a surface 46 that is located radially outwardly from the surfaces 36 and 38 and that forms therewith respectively associated shoulders 48 and 50. Surface 46 is concentrically disposed with respect to surface 30 of girth 28, the radius of curvature of surface 46 being slightly larger than the radius of curvature of surface 30 whereby an annular clearance space 52 is provided at the ball-to-socket interface between surfaces 46 and 30 of bearing 18.

Figure 2:
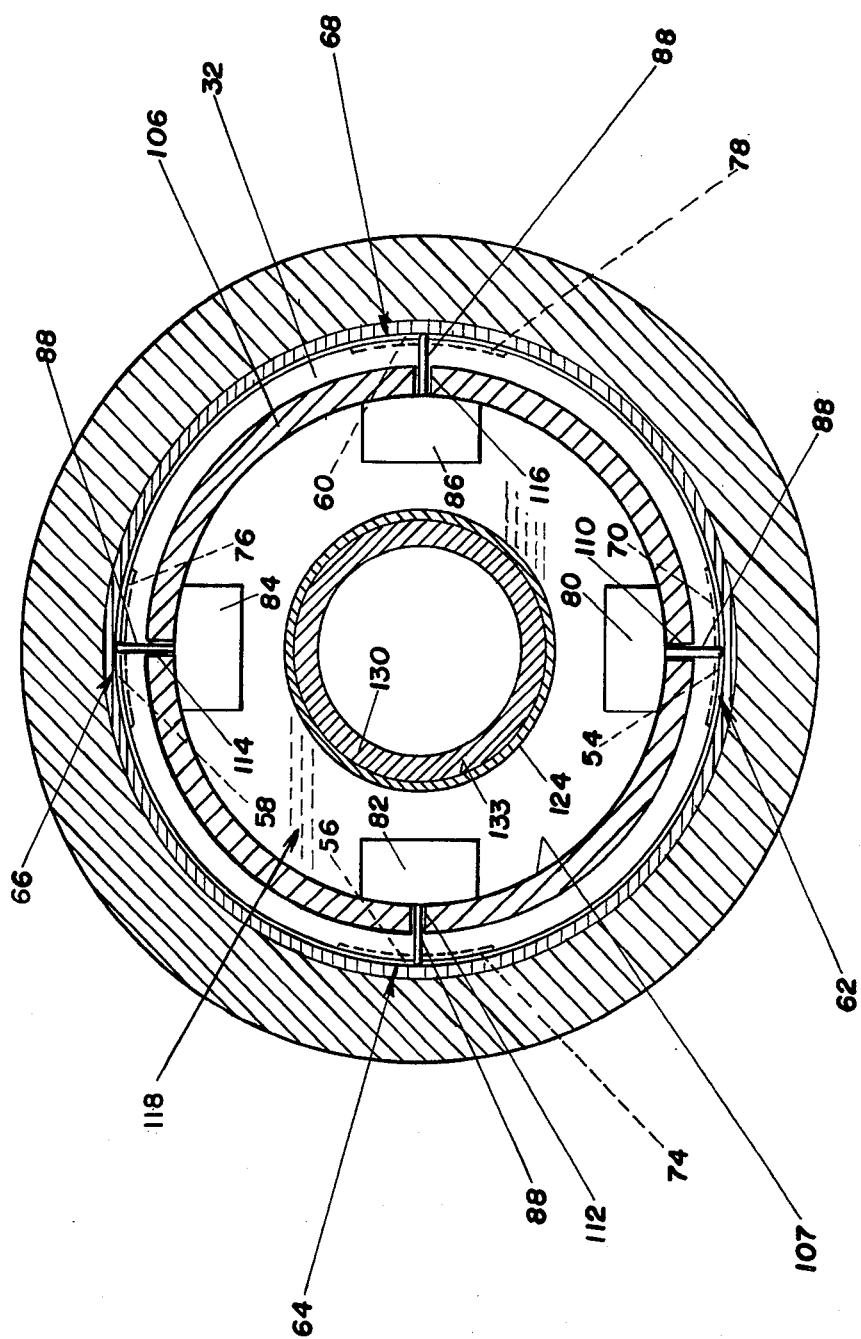
FIG. 2 is a sectional view of the aft end of the rocket motor taken along the lines 2—2 of FIG. 1.
Figure 3:
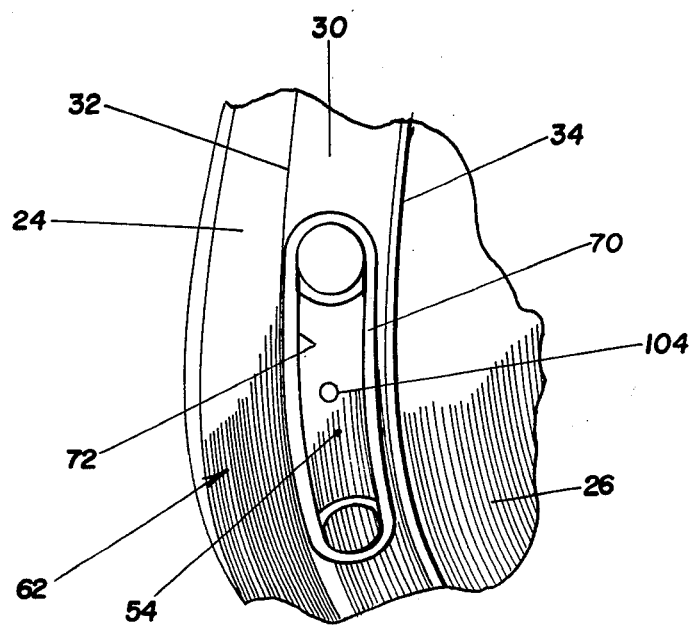
FIG. 3 is a perspective view of a portion of the outer surface of the inner race of the spherical bearing of FIG. 1 and shows one of the lateral support pad areas.

Multiple pressure controlled hydraulic chambers indicated collectively in FIGS. 1-3 at 54, 56, 58 and 60, specifically one such chamber in each quadrant of the spherical bearing 18, are provided at the interface 52 of inner race 20 and outer race 22. Each of the hydraulic chambers 54, 56, 58 and 60 provides a lateral support pad area, indicated at 62, 64, 66 and 68, respectively, for the inner race 20 with respect to the outer race 22. Each pad area is located upon the surface 30 of the circumferential girth 28.

A typical chamber and associated lateral support area are illustrated in the perspective view of FIG. 3 which shows a portion of the outer surface of inner race 20. As shown in FIG. 3, chamber 54 and lateral support area 62 are formed by a closed loop seal 70 that is placed in a race track groove 72 that is trepanned or otherwise machined into surface 30 of girth 28. Each of the closed loop seals may comprise a semi-resilient O-ring or the like and is restrained from excessive motion or extrusion into the clearance space 52 by an associated race track groove 72 into which the seal is placed. As shown in FIG. 2, closed loop seals 74, 76 and 78 are respectively associated with lateral support areas 64, 66 and 68.

As supported in outer race 22, inner race 20 bears only on annular seal 42 and on the closed loop seals 70, 74, 76 and 78 that are spaced around the circumferential girth 28 with one such closed loop seal being provided in each quadrant. The several surfaces at the interfaces between the inner race 20 and the outer race 22 cannot touch unless the annular seal 42 and/or the closed loop seals 70, 74, 76 and 78 are abnormally compressed by lateral, or axial, imbalance of the load on the inner race 20. There is a tendency for this to occur under certain conditions, as previously mentioned herein, causing friction and interference with proper and desired nozzle movement.

In accordance with the invention, the pressure within each of the hydraulic chambers 54, 56, 58 and 60 is controlled to maintain lateral, or axial, centering of the inner race 20 relative to the outer race 22. The hydraulic pressure in each chamber is controlled by a sensing device or lateral support valve body individual thereto, specifically a mechanical/hydraulic spool valve such as that illustrated diagrammatically in FIG. 4. Each spool valve senses the depth of the clearance space 52 at the associated lateral support pad area 62, 64, 66 or 68 and operates upon variation in the depth of the clearance space 52 to control the pressure within the associated hydraulic chamber to force the inner race 20 back to a central position with respect to the outer race 22.

As seen in FIG. 2, lateral support valve bodies 80, 82, 84 and 86 are respectively associated with hydraulic chambers 54, 56, 58 and 60. Each of the valve bodies include a mechanical/hydraulic spool valve that may be of known type, a typical such valve being shown in FIG. 4. As there illustrated, each spool valve includes a valve extension or pin 88, a valve body 90, a spool 92, an inlet or pressure port 94, an outlet pressure port 96, and a vent outlet or opening 98. By sliding the valve stem 88 in and out, the ports 94 and 98 may be opened or closed by the spool 92. A lower land 100 of spool 92 is formed with passage holes 102 therein. Accordingly, upon movement inwardly of valve stem 88 a distance sufficient to cause spool 92 to open the inlet port 94, as when the surface 30 of inner race 20 moves closer to the surface 46 of outer race 22, hydraulic fluid pressure is provided through passage holes 102 and outlet pressure port 96. Pressure port 96 of each of the spool valves communicates with an individually associated hydraulic chamber 54, 56, 58 or 60 by means of a hydraulic port that is individual to each chamber. One such port, that for chamber 54, is indicated at 104 in the outer wall 106 of the inner race 20, as shown in FIGS. 1 and 3.

Figure 4:
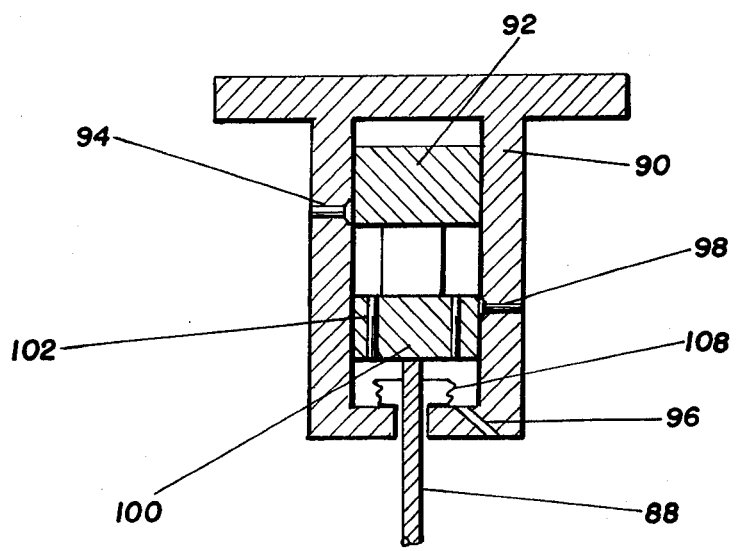
FIG. 4 is a sectional view of a typical mechanical/hydraulic spool valve centering detector that is embodied in each of a plurality of lateral support valve bodies that are associated with said lateral support areas.

In order to prevent hydraulic fluid from escaping past stem 88, the stem 88 desirably is sealed to the interior of the valve body 90, as for example, by a bellows or other suitable seal shown at 108 in FIG. 4. Seal 108 is designed so as not to interfere with the free movement in and out of the valve body 90 by the valve stem 88, such movement being controlled responsively only to the relative movement of the inner race 20 with respect to the outer race 22. As shown in FIGS. 1 and 2, the valve stem 88 of each of the spool valves 80, 82, 84 and 86 extends through a respectively associated opening 110, 112, 114 and 116 in the outer wall 106 of inner race 20.

Upon movement of stem 88 outwardly of valve housing 90, as when the adjacent surface of inner race 20 moves away from the surface of outer race 22, the fluid pressure in the associated hydraulic chamber is allowed to vent, such fluid being dumped overboard. Such venting takes place through the port that is associated with the chamber, the port 104, for example, when the chamber involved is chamber 54, through the port 96, the passages 102 of land 100, vent outlet 98 of the spool valve 80, and through a further vent outlet, not shown, from where the hydraulic fluid is dumped overboard, the inlet port 94 of the spool valve that is involved meanwhile being maintained in a closed position.

As shown in FIGS. 1 and 2, a sealed reservoir 118 of hydraulic fluid is provided within a space indicated at 120, contained within inner race 20 and having the shape of a torous. Pressure for forcing fluid from this reservoir 118 through the lateral support valve bodies 80, 82, 84 and 86 for centering the inner race 20 relatively to the outer race 22 is derived, desirably although not necessarily, from the combustion chamber pressure of the rocket motor 10. To that end there is provided a chamber pressure port 122, a diaphragm seal such as disclosed in my prior U.S. Pat. No. 3,912,172, being provided, although, not shown, between the combustion chamber gases and the torous 120.

For sealing the reservoir of hydraulic fluid within the toroidal space 120 interiorly of inner race 20, there is provided a pressurization bladder 124 that may be made of suitable material such as rubber or the like. Bladder 124 has the general form of a tube having a reentrant portion; that is to say, a tube having an outer portion 126 that is shorter than a reentrant or inner portion 128. The edge 129 of outer tube portion 126, as seen in FIG. 1, is suitably sealed to the inner surface 107 of outer wall 106 while the edge 131 of inner portion 128 is sealed to the inner surface 133 of an inner wall 130 and to an abutting surface 135 within inner race 20.

FIGS. 5, 6 and 7 are diagrammatic functional illustrations of the operation, in the first embodiment of the invention, of the lateral support valve bodies 80, 82, 84 and 86 in maintaining the inner race 20 centered within the outer race 22.

The representation of FIG. 5 shows nominal pressure being maintained in chamber 54 at pad area 62, the inner race 20 at that area being properly centered in outer race 22. The spool valve of each valve body is arranged within the hydraulic reservoir 118 with its stem 88 extending into contact with the annular concave surface 46 of the outer race 22 such that nominal hydraulic pressure is normally maintained in the associated hydraulic chamber 54, 56, 58 and 60. Each stem 88 is maintained in firm contact with the surface 46 at all times by the hydraulic pressure of reservoir 118 exerted on spool 92 through a port 89 whereby slight deviations of the inner race 20 from its desired lateral, or axial, central position relatively to the outer race 22 are sensed.

The illustration of FIG. 6 depicts lateral movement of the inner race 20 toward the outer race 22 in the vicinity of pressure chamber 54, the valve body 90 of the spool valve 80 moving with the inner race 20 while the valve spool 92 remains fixed in position relatively to the outer race 22 since the valve stem 88 is in firm contact with the outer race surface 46. The relative movement of the valve body 90 and valve spool 92 communicates reservoir pressure from the fluid reservoir 118 through inlet port 94 and the passage holes 102 in land 100 to the sealed hydraulic pressure chamber 54. As a result, there is generated an expansive force within chamber 54 at the lateral support pad area 62 against the adjacent surface 30 of the inner race 20 that tends to drive the inner race 20 back to a centered position relatively to the outer race 22.

Opposite lateral movement of the inner race 20 with respect to the outer race 22, that is movement of the inner race 20 away from outer race 22 in the vicinity of the hydraulic chamber 54, is depicted in FIG. 7. When such movement occurs, the relative movement of the valve body 90 and valve spool 92 causes closing or blockage of the inlet port 94, and hence, cutting off of communication of reservoir pressure to hydraulic chamber 54, and venting of the fluid from chamber 54 through vent outlet 98, thus allowing the spool valve 84 and pressure chamber 58 on the opposite side of the inner race 20 to cooperate in providing a force, as described in connection with FIG. 6, to drive the inner race 20 back toward its central position relatively to outer race 22.

Embodiment 1 of the invention illustrated and described herein by reference to FIGS. 1–7 comprises a spherical bearing lateral support configuration that is particularly useful for larger nozzles. For this configuration to be feasible, the nozzle 14 is required to be large enough to incorporate internally, as shown and described, the reservoir of hydraulic fluid 118, the mechanical/hydraulic lateral support valve bodies 80, 82, 84 and 86, and the associated hardware within the movable portion of the nozzle.

Where the nozzle of the rocket motor is not large enough to incorporate the hydraulic reservoir and the mechanical/hydraulic, lateral support valve bodies internally, a modified form of the invention may be utilized. Such a modification, referred to herein as embodiment 2 of the invention, is illustrated in FIG. 8 wherein hydraulic fluid and pressure is obtained from a source that is located externally of the spherical bearing and the lateral support valve bodies are mounted on the outer race or socket, externally thereof.

Figure 8:
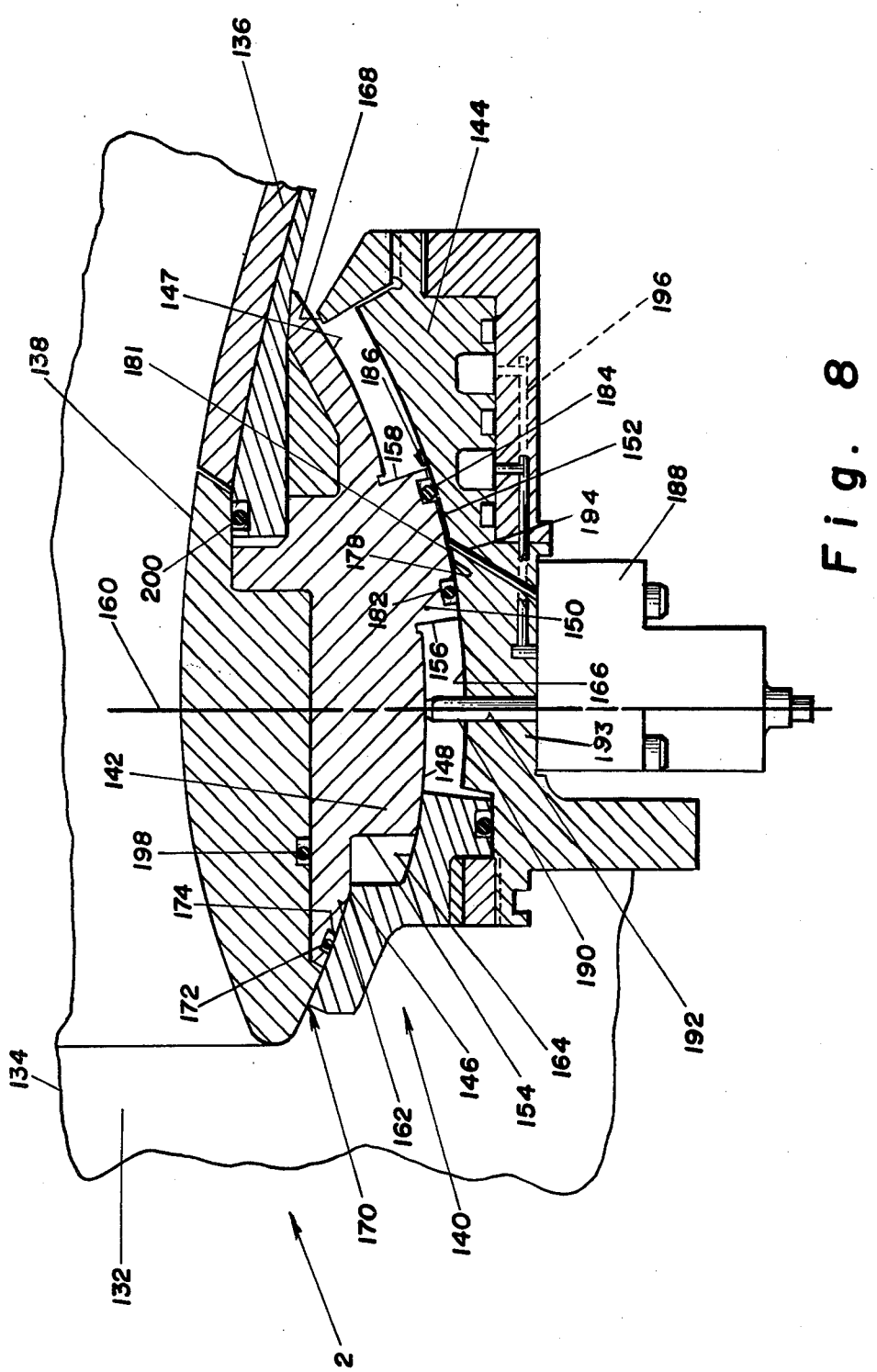
FIG. 8 is a partial longitudinal sectional view of the aft end of a rocket motor incorporating a second embodiment of the invention.

Embodiment 2 of the invention, as illustrated in FIG. 8, comprises a partial longitudinal sectional view of the aft end of a rocket motor indicated at 132 having a case 134, shown broken away, containing a solid propellant, not shown, and including a thrust nozzle 136. Nozzle 136 is shown in section, partially broken away, having formed therein an internal exit cone surface 138 of a convergent-divergent type, and is mounted on case 134 by means of a spherical bearing indicated at 140.

The bearing 140 includes an inner race 142 and an outer race 144. Inner race 142 includes a first outer rounded annular surface 146, a second outer rounded annular surface 147, and a third outer rounded annular surface 148. A circumferential girth 150 on inner race 142, provided between surfaces 147 and 148, has an annular rounded surface 152. As shown, a shoulder 154 is formed between annular surfaces 146 and 148 and opposed annular shoulders 156 and 158 are formed, respectively, between annular surfaces 148 and 147 and the surface 152 of the circumferential girth 150.

As shown in FIG. 8, annular surface 146 is located forward of the equatorial plane indicated at 160 of the bearing 140, and annular surface 147 and the girth 150 are located aft of the equatorial plane 160. Variable portions of the annular surface 148 are located forward and aft of the equatorial plane 160 depending upon the relative angular adjustment of the inner race 142 with respect to the outer race 144.

The outer race 144 of bearing 140 includes annular inner rounded surfaces indicated at 162, 164, 166 and 168, surfaces 162 and 164 and a portion of surface 166 being located forwardly of the equatorial plane 160, and the surface 168 and the remaining portion of surface 166 being located aft of the equatorial plane 160.

The several described annular rounded inner race and outer race surfaces are disposed concentrically with each other, specifically surfaces 146 and 162, surfaces 148 and 164, surfaces 147 and 168, and surfaces 152 and 166, only slight clearance spaces being provided between the interfaces of the several surfaces except for the interface of surfaces 147 and 168 where a larger clearance space may be provided.

Clearance space 170 between surfaces 146 and 162 is fully sealed and enclosed by an annular or circumferential seal 172. Seal 172 may comprise a semi-resilient O-ring or the like, being restrained from excessive motion or extrusion into the clearance space 170 by a groove 174 that is machined in surface 146.

Figure 10:
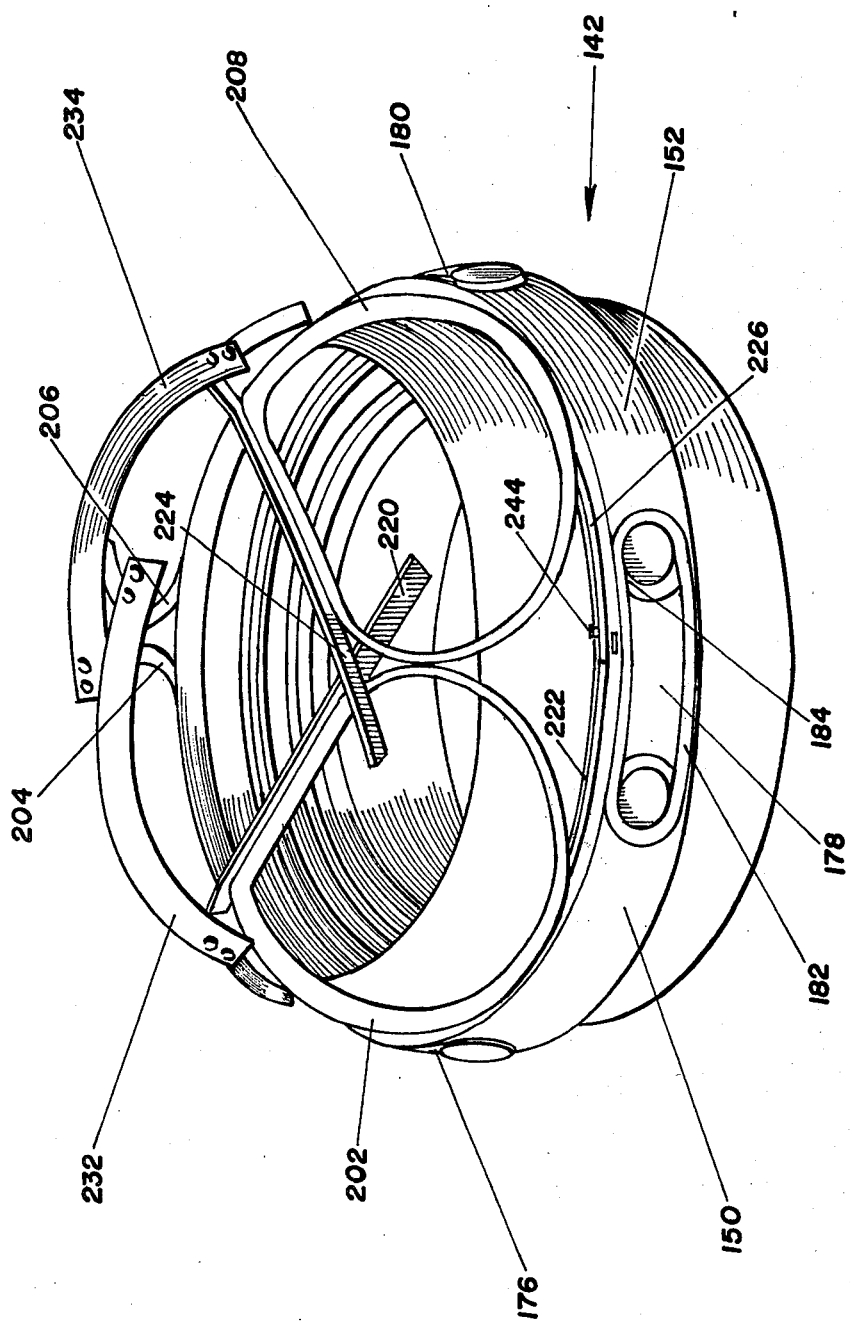
FIG. 10 is a perspective view of the inner race of the spherical bearing of FIGS. 8 and 9 showing seals in spaced lateral support areas, with aft flexible seal cavity members attached.

Similarly to the embodiment of FIG. 1, multiple pressure controlled hydraulic chambers, specifically one in each quadrant of the spherical bearing 140, are provided at the interface of surface 166 of the outer race 144 and the surface 152 of the girth 150 of the inner race 142. The locations of three such chambers are indicated at 176, 178 and 180 in the perspective view of the inner race 142, as seen in FIG. 10, the chamber 178 also being indicated in FIG. 8. Each of these hydraulic chambers and a fourth such hydraulic chamber, not shown, but which is spaced 180° around the inner race 142 from chamber 178, as seen in FIGS. 8 and 10, provide a lateral support pad area for the inner race 142 within the outer race 144, each such pad area being located upon the surface 152 of the girth 150. The pad area associated with hydraulic chamber 178 is indicated in FIG. 8 by reference number 181.

As illustrated in FIG. 10, particularly with reference to chamber 178, the hydraulic chamber in each of the quadrants of the inner race 142 is formed by a closed loop seal or O-ring 182 that is placed in a race track groove 184 that is trepanned or machined into the annular space 152 of girth 150. Each of the closed loop seals may comprise a semi-resilient O-ring or the like and is restrained from excessive motion or extrusion into the clearance space, indicated at 186 in FIG. 8 by the groove 184 into which the seal 182 is placed.

Inner race 142, as supported in outer race 144, bears only an annular seal 172 and on the closed loop seals 182 that are spaced around the circumferential girth 150, with one such seal 182 in each quadrant. The several surfaces at the interfaces between the inner race 142 and the outer race 144 cannot touch unless the annular seal 172 and/or the closed loop seals 182 are abnormally compressed by lateral, or axial, imbalance of the load on the inner race 142.

In the embodiment of the invention illustrated in FIGS. 8 and 10, the pressure within each of the hydraulic chambers 176, 178 and 180 and that not shown but spaced 180° around the circumference of girth 150 from chamber 178, is controlled to maintain lateral, or axial, centering of the inner race 142 relative to the outer race 144. The hydraulic pressure in each chamber is controlled by a sensing device or lateral support valve body that is individual thereto, such for example, as the spool valve illustrated in FIG. 4. Similarly to the embodiment of the invention of FIG. 1, each detector senses the depth of the clearance space 186 at the associated lateral support pad area and operates to control the pressure within the associated hydraulic chamber to force the inner race 142 back to a central position with respect to the outer race 144 upon deviation of the inner race 142 from the central position.

In the embodiment of the invention of FIG. 8, a separate lateral support valve body is provided externally of outer race 144 in association with each of the four hydraulic chambers, one such valve body only being shown, specifically that indicated at 188. A valve body or spool extension or pin 190 extends from valve body 188 through an opening 192 in the wall 193 of outer race 144 into engagement with the surface 148 of the inner race 142. The lateral support valve body in each quadrant of the spherical bearing 140 is mounted by suitable means, as known to those skilled in the art, to the outer race 144, externally thereof, with its associated spool extension or pin extending through the wall 193 of the outer race 144 into engagement with the surface 148 of the inner race 142. Hydraulic porting to each of the pad areas from the associated lateral support valve body is provided by an individually associated passage in the wall 193 of the outer race 144, such as that indicated at 194 in FIG. 8. Hydraulic fluid is provided to each of the lateral support valve bodies from an external source, not shown, by means of a hydraulic manifold indicated at 196.

The operation of embodiment 2 of the invention shown in FIG. 8, in maintaining the inner race 142 centered within the outer race 144, is generally similar to that of embodiment 1 of FIGS. 1–7 in that upon movement of the inner race surface 148 toward the outer race surface 166 in the pad area 181, for example, an expansive force is generated within chamber 178 as a result of the spool extension 190 being pushed inwardly of lateral support valve body 188. This tends to drive the inner race 142 back to a centered position with respect to the outer race 144. Simultaneously, during the function time of such operation, the surface of 148 that is on the opposite side of the inner race 142 will have initially been moved away from the outer race surface 166, and such movement will have been detected by the lateral support valve body there positioned. This will cause venting of the associated hydraulic chamber and thereby facilitate return of the inner race 142 to a central position within the outer race 144.

As shown in FIG. 8, suitable annular seals 198 and 200 may be provided for sealing various component parts that because of structural and functional reasons are required in forming the inner race 142 of the spherical bearing 140.

Figure 9:
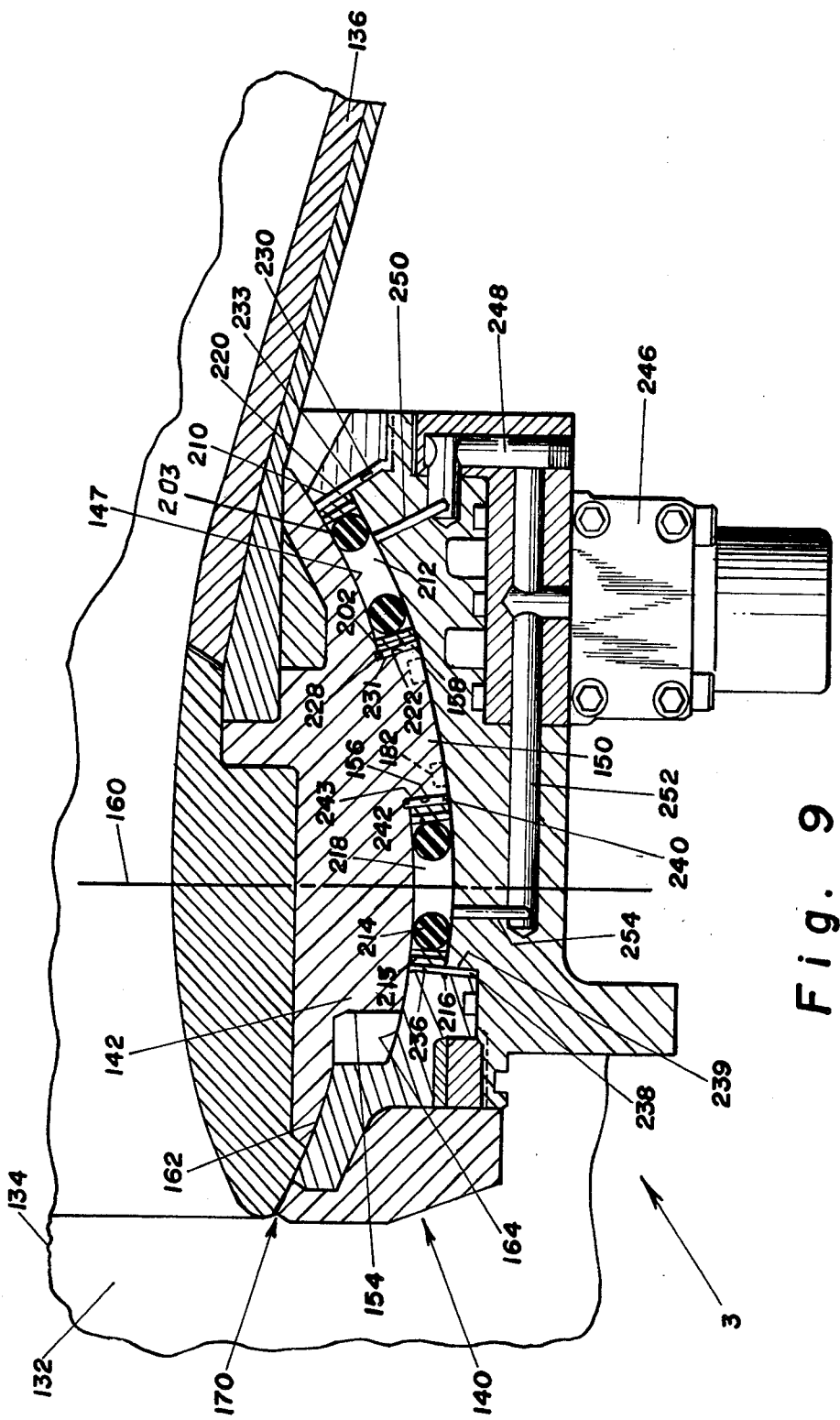
FIG. 9 is a partial longitudinal sectional view of the aft end of the rocket motor of FIG. 8 with the spherical bearing rotated 45° on its longitudinal axis thereby revealing an actuation system for the bearing and rocket motor nozzle.

In FIG. 9 there is illustrated a further invention embodiment, designated embodiment 3, comprising a partial longitudinal sectional view of the aft end of the rocket motor 132 of FIG. 8, which view shows the spherical bearing 140 rotated 45° on its longitudinal axis. Such rotation reveals a self actuation or internal actuation system for the bearing 140 for controlling the angular direction of the thrust nozzle 136 with respect to the rocket motor 132 thereby to steer the vehicle in which the rocket motor 132 is mounted.

The internal actuation system, as indicated in FIGS. 9 and 10, includes, located about the periphery of the inner race 142, four forward flexible seal cavities with one such cavity in each quadrant, and four aft flexible seal cavities, again with one such cavity in each quadrant. A closed loop or kidney seal is located in each of said forward and aft cavities, being retained therein by an associated flexible retainer band. One such forward seal 214 and one such aft seal 203 are shown in FIG. 9.

FIG. 10 shows the inner race 142 of the bearing 140 with the four aft flexible retainer bands attached, these bands being designated by reference numbers 202, 204, 206 and 208, the band 202 being seen in cross section in FIG. 9. As seen in FIG. 9, the band 202 in conjunction with the shoulder 158 of girth 150 and a shoulder 210 formed at the aft end of outer race 144 form an aft flexible seal cavity 212. The bands 202, 204, 206 and 208 are attached in a manner to be described to the shoulder 210 and to the aft shoulder 158 of the circumferential girth 150 of the inner race 140.

While not shown in FIG. 10, there are also provided four forward flexible bands that are attached to the forward shoulder 156 of the girth 150 of inner race 140 with one such band in each of the quadrants that contains an aft band 202, 204, 206 or 208. One such forward flexible band is indicated at 215 in FIG. 9, band 215 in conjunction with shoulder 156 of girth 150 and a shoulder 216 between outer race surfaces 164 and 166 forming a forward flexible seal cavity 218. The flexible seal cavity 218 and the other three forward flexible seal cavities that are provided are all disposed on the equatorial plane 160 of the bearing 140.

Thus, there is provided about the periphery of the inner race 142 four sets of diametrically opposed actuating flexible seal cavities, with the centers of two sets of cavities being located in a first plane and the centers of the other two sets of cavities being located in a second plane, the first and second planes being angularly displaced 90° from each other, intersecting each other on the longitudinal axis of the inner race 142. Additionally, the first and the second planes are each angularly displaced 45° from the center of each of the race track centering chambers. The two sets of cavities in the first plane operate independently of the two sets of cavities in the second plane, with the cavities in the first plane, for example, controlling the vertical sweep or pitch of the nozzle 136 and the cavities in the second plane controlling the horizontal sweep or yaw. Even though the operation of the cavities in each of the planes is independent, however, their actuating operations are controlled in such a manner that the direction of nozzle 136 can be swept universally through a full 360° circular area at its outer end as defined by the structural limits of the nozzle mechanism.

With respect to the manner of attachment of the flexible retainer bands to the inner race 142 and to the outer race 144, it will be seen by reference to FIG. 10 that each of the aft bands 202, 204, 206 and 208 is attached on opposite outer sides, as by a suitable adhesive to first and second retaining support members. The members are each made of a suitably thin rigid material, which may be metal. Each member has a length approximately or slightly less than one-fourth that of the periphery of the inner race at the location of the seals and is curved edge wise to conform to the rounded outer surface 147 of the inner race 142.

Specifically, as seen in FIG. 10, aft flexible band 202 is attached along one side of its length to a retainer band support member 220 and along the other side thereof to a retainer band support member 222. Aft flexible band 208 is attached along one side to a similar member 224 and along the other side to a similar member 226. Each of the members 220, 222, 224 and 226 is wider than the flexible band supported thereby. This provides an overhang or edge along the length of the bands 202 and 208 for retaining the members 220 and 222 fixed in position with respect to the outer race 144 and for retaining the members 222 and 226 fixed in position with respect to the inner race 142. The overhang or edge with respect to each of the members associated with each of the retainer bands is in one direction along one long side of the band and is in the other direction along the other long side of the band. Thus, edge 228 of member 222 is inserted into a recess 231 at the shoulder 158 of the girth 150, and edge 230 of member 220 is inserted into a recess 233 at the shoulder 210 of outer race 144 of shoulder 210, as seen in FIG. 9.

The aft flexible band 208, as seen in FIG. 10, is similarly retained in position with respect to the inner race 142 and outer race 144, member 224 being retained in recess 233 at the shoulder 210 of the outer race 144 and the member 226 being retained in the recess 231 at the shoulder 158. Aft flexible retainer bands 204 and 206 are similarly retained in position relatively to the inner race 142 and outer race 144, the members 232 and 234 being provided respectively, for retaining bands 204 and 206 in position at the shoulder 210 of the outer race, the members for retaining the bands 204 and 206 in position at the shoulder 158 of the inner race 142 not being shown.

The manner of attachment of the forward flexible retainer bands to the inner race 142 and to the outer race 144 may be similar to that described with reference to the aft flexible bands 202, 204, 206 and 208. As seen in FIG. 9, the forward flexible band 215 is retained in position with respect to the outer race by a member 236 which has an edge portion 238 that is retained in position in a recess 239 in outer race 144 provided at shoulder 216. Retainer band 215 is retained in position with respect to the inner race 142 by a member 240 having an edge portion 242 that is retained in a recess 243 provided in inner race 142 at shoulder 156. The other three forward flexible bands, not shown in the drawing, may be similarly retained in position with respect to the inner race 142 and the outer race 144.

There may be provided, as shown in FIG. 10, further means for retaining the ends of each of the aft and forward flexible bands in position with respect to the inner race 142 and the outer race 144. Such means may comprise a pin as indicated at 244 in FIG. 10 at the end of each of the members 222 and 226 for retaining the members 222 and 226 fixed in position, each pin at a shoulder 156 or 158 of the girth 150 being rigid therewith and each pin at a shoulder 210 or 216 of the outer race being rigid therewith.

A pressurized fluid supply and control system for the internal actuation system of FIGS. 9 and 10 may be provided as disclosed, for example, in my prior patent wherein pressurized fluid such as Type A automotive hydraulic fluid is supplied from a pressurized fluid source through suitable conduits to a servo control valve. Such a servo control valve is indicated in FIG. 9 at 246, and includes control valve means and suitable passages that are provided in association with each of the four aft flexible actuation cavities and the four forward flexible actuation cavities that are provided, as described, between the inner race 142 and the outer race 144, around the periphery of the inner race 142. Specifically, as shown in Fig. 9, there is provided a hydraulic manifold 248, an aft porting passage such as passage 250 for each of the aft flexible cavities and a forward porting passage such as passage 252 and a communicating passage 254. These several passageways provide communication from the fluid pressure source to one of the cavities, for example, cavity 212, as seen in FIG. 9, and from the cavity diametrically opposed to cavity 212 to a vent to the atmosphere or a fluid dump, and in a second position reverses the communication. Additionally, the various valves are of the servo type so that the flow to and from the various forward and aft cavities is controlled. In this manner the extent and rate of angular movement of the nozzle 136 is controlled.

While an internal actuation system for controlling the movement of the nozzle 16 has not been shown in connection with embodiment 1 of the invention illustrated in FIGS. 1–7, it will be understood that an internal actuation system similar to invention embodiment 3 described in FIGS. 9 and 10 may be employed therein, if desired, the internal actuation cavities being displaced both longitudinally and angularly from the centering pressure pad areas. In such a further embodiment of the invention, the pressurized fluid supply for the internal actuation system may be contained within the internal torous or space 120 on the inner race 20.

There has been provided according to the present invention a system for overcoming problems associated with spherical bearings that are exposed to heavy loads and hostile environments and requiring substantial clearance space to be provided between the inner race and the outer race to allow for differential expansion therebetween. The structural arrangements provided are characterized by their ability, upon imbalance of lateral, or axial, loads on the inner race with respect to the outer race that tend to result in deviation of the inner race from a central position to sense such deviation and to force the inner race back to a central position with a high degree of accuracy. In an operative embodiment of the invention the inner race has been held centered within the outer race to within 0.001 inches. The invention is further characterized in its provisions that allow ready incorporation within the spherical bearing of an internal self actuation system.

What is claimed is:

1. A centering system for a spherical bearing having an inner race and an outer race, clearance space between said inner race and said outer race being provided to allow for differential expansion,
    sensing means for sensing lateral displacement of said inner race from a central position with respect to the outer race, and
    control means responsive to said sensing means to restore said inner race to said central position with respect to said outer race upon displacement therefrom,
    wherein said control means includes a plurality of hydraulic chambers located at spaced intervals about the interface of the inner race and the outer race of the bearing, and wherein said sensing means includes a mechanical/hydraulic valve associated with each of the hydraulic chambers, pressure in each chamber from a source of pressure being controlled by the associated valve which senses the clearance space between the inner race and the outer race and pressurizes or vents the chamber to maintain the inner race centered in the outer race.

2. A centering system as specified in claim 1 wherein each mechanical/hydraulic valve is a spool valve having a stem that is movable in accordance with the clearance between the inner race and the outer race, each of said spool valves being located internally of the inner race, and wherein a reservoir of hydraulic fluid for actuating said hydraulic chambers is contained within said inner race.

3. A centering system as specified in claim 2 wherein each mechanical/hydraulic valve includes a body portion that is located within said reservoir of hydraulic fluid.

4. A centering system as specified in claim 1 wherein each mechanical/hydraulic valve is a spool valve having a stem that is movable in accordance with variations in the clearance between the inner race and outer race.

5. A centering system as specified in claim 4 wherein a hydraulic chamber and spool valve is located in each quadrant about the periphery of the interface between the inner race and the outer race.

6. A centering system as specified in claim 5 wherein the spool valves are located internally of the inner race with the stems thereof in contact with an inner surface of the outer race.

7. A centering system as specified in claim 6 wherein the spool valves are located externally of the inner race and the stems thereof are in contact with a surface of the inner race.

8. A centering system for the ball of a ball joint mounted nozzle for a rocket motor wherein the ball joint includes a ball and socket and the nozzle is angularly movable by the application of fluid pressure from a pressure system to the ball joint to cause steering movement thereof, said centering system including sensing means for sensing lateral displacement of the ball from a central position in the socket of said ball joint, and control means responsive to said sensing means to restore the ball to said central position,
    wherein said control means includes a plurality of hydraulic chambers that are located at spaced intervals about the ball joint, and wherein said sensing means includes a mechanical/hydraulic valve that is associated with each of the hydraulic chambers, pressure in each chamber being controlled from the pressure system by the associated valve which senses displacement of the ball from said central position.

9. A centering system as specified in claim 8 wherein each mechanical/hydraulic valve a spool valve have a stem that is movable in accordance with the clearance between the ball and socket of the ball joint.

10. A centering system as specified in claim 9 wherein the ball has a rounded outer surface and the socket has a mating rounded inner surface, each of said spool valves is located internally of the ball with the stem thereof in engagement with the inner surface of the socket, and, wherein a reservoir of hydraulic fluid for actuating said hydraulic chambers is contained within the ball.

11. A centering system as specified in claim 10 wherein each mechanical/hydraulic valve includes a body portion that is located within said reservoir of hydraulic fluid.

12. A centering system as specified in claim 11 wherein a hydraulic chamber and a spool valve is located in each quadrant about the periphery of the interface between the ball and socket of the ball joint.

13. A centering system as specified in claim 12 wherein the spool valves are located externally of the inner race with the stems thereof in contact with the outer rounded surface of the ball.

14. A centering system as specified in claim 8 wherein each of the hydraulic chambers is formed by a closed loop seal in the interface between the ball and socket of the ball joint.

15. A centering system as specified in claim 14 wherein a groove individual to each of the closed loop seals is provided in the outer surface of the ball for retaining the associated seal in place.

16. A centering system as specified in claim 15 wherein each of said grooves is shaped in the form of a race track and each of said closed loop seals is flexible and is adapted to conform to the shape of the associated groove.

17. A centering system as specified in claim 8 wherein the ball is angularly movable in said ball joint by fluid pressure that is selectively applied to a plurality of actuating cavities that are located at spaced intervals about the ball joint, each of said cavities being formed by a closed loop seal at the interface between the ball and socket of the ball joint, the spacing of said cavities alternating with said hydraulic chambers about the longitudinal axis of said ball joint.

18. A centering system as specified in claim 17 wherein the planes containing said plurality of cavities are angularly spaced approximately 45° from the planes containing said hydraulic chambers, all of said planes being parallel to and intersecting the longitudinal axis of said ball joint.

19. A centering system as specified in claim 18 wherein said plurality of cavities include four cavities that are located substantially on the equatorial plane of said ball joint and are spaced apart approximately 90° from each other.

20. A centering system as specified in claim 19 wherein said plurality of cavities include four additional cavities that are located aft of the equatorial plane and are spaced apart 90° from each other.

21. A centering system as specified in claim 20 wherein each of said closed loop seals is elongated and wherein a retaining band is provided to support each of said closed loop seals on each of the longer sides thereof.

22. A centering system as specified in claim 21 wherein each of the retaining bands has a width greater than that of the closed loop seals, the long sides of each of the closed loop seals being firmly attached to its associated retaining band by an adhesive, the manner of such attachment for each seal being such that there is a first overhang of one of said bands in one direction along one long side of each seal and a second overhang of the other of said bands in the opposite direction along the other long side of each seal.

23. A centering system as specified in claim 21 wherein a first recess is provided in the ball in association with the long side of each of said seals and a second recess is provided in the socket adjacent the other side of each of said seals, the first overhang of the band associated with each of said seals being inserted in and retained by an associated first recess, and the second overhang of the other band associated with each of said seals being inserted in and retained by an associated second recess.

* * * * *